UNITED STATES PATENT OFFICE.

WILLIAM H. ST. JOHN AND PETER CARTWRIGHT, OF NEW YORK, N. Y.

IMPROVEMENT IN COMPOSITION FOR PURIFYING ILLUMINATING-GAS.

Specification forming part of Letters Patent No. 76,544, dated April 7, 1868.

To all whom it may concern:

Be it known that we, WILLIAM H. ST. JOHN and PETER CARTWRIGHT, of the city, county, and State of New York, have invented a new and Improved Mode or Process of Purifying Illuminating-Gas made from bituminous coal; and we do hereby declare that the following is a full, clear, and exact description thereof, and the manner of using the same.

The nature of our invention consists in using the hydrated or hematite iron ores in a fine or pulverized condition, adding thereto, according to the richness or quality of the ores used, gray cast-iron borings, turnings, or filings sufficient to make the mass equal to about eighty per cent. of pure metal: it is then to be thoroughly saturated with ammoniacal liquor, when it should be thrown into a heap and allowed to generate heat enough to produce evaporation, which makes itself evident by the escape of steam, after which it should be scattered into a layer, say twelve or fifteen inches deep, and stirred or worked till all moisture has disappeared. The oxidation of the ore as well as the borings is then complete. We then add five per cent. of pulverized charcoal to the mass and mix it well together, when the composition is ready for use. Before placing the composition in the purifiers, we moisten it with water, as lime is in the purification by lime.

We then place a layer of perforated boards in the bottom of the purifier for the material to rest upon; it is then thrown in from two to three feet deep, as the purifier may be, when it is leveled off, and the purifier is closed up to receive the gas. We use the same purifiers and machinery generally used in the method of purification by lime. After the strength of the composition is exhausted, (as ascertained by the usual test,) the purifier is changed in its turn, and the composition taken out and thrown into a heap for a time, when reoxidation commences, and it is treated in the same manner as before, and by repeating the process the same material may be used again and again.

When the reoxidation takes place slowly by reason of any stress of weather that may exist, we use, to secure more rapid action, equal quantities of water and ammoniacal liquor for moistening purposes.

We claim that our composition, prepared and used as above set forth, performs its work better and will last longer than any other, by maintaining its porosity without the aid of sawdust, &c., and its strength not only to purify the gas, but to throw off by evaporation a large percentage of the impurities neutralized by the fumes of ammonia precipitated into itself; that it most effectually destroys the unhealthy and objectionable odor of sulphide of hydrogen existing in all districts where gas-houses are located; also, that on account of the fewer changes of the purifiers the labor necessary is reduced full fifty per cent.

What we claim as our invention, and desire to secure by Letters Patent, is—

The process of purifying illuminating-gas made from bituminous coals, by transmitting it through a composition of pulverized iron ore strengthened to about eighty per cent. of pure metal, moistened with ammoniacal liquor and mixed with about five per cent. of pulverized charcoal, and prepared as more fully set forth above.

WM. H. ST. JOHN.
PETER CARTWRIGHT.

Witnesses:
JOHN J. THOMASSON,
WILLIAM T. BALLARD.